April 23, 1957     F. H. PFUNDT     2,789,877
APPARATUS FOR SMOKING FISH OR MEAT
Filed March 4, 1954
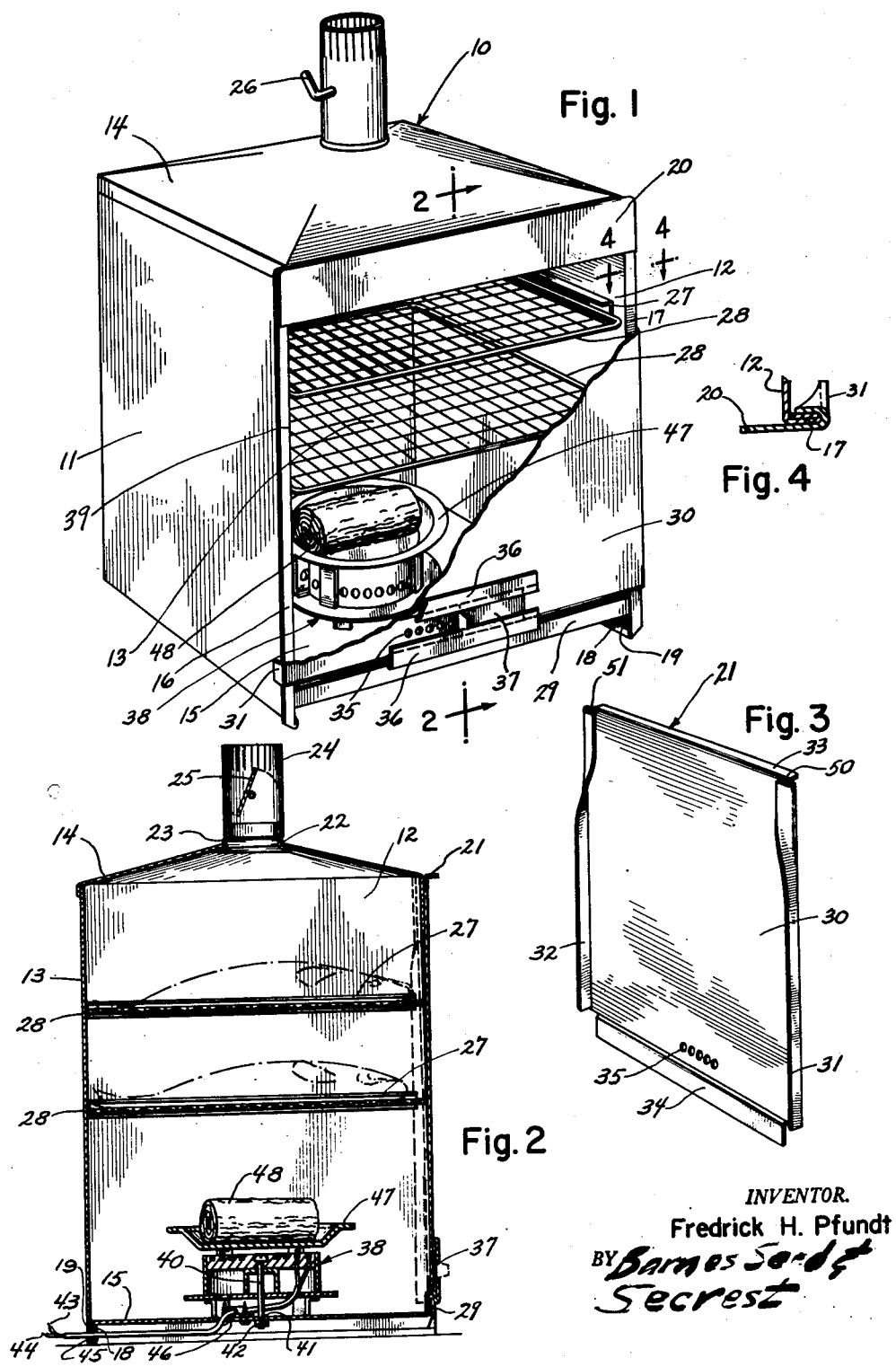
INVENTOR.
Fredrick H. Pfundt
BY Barnes Sard &
Secrest

United States Patent Office 2,789,877
Patented Apr. 23, 1957

2,789,877

APPARATUS FOR SMOKING FISH OR MEAT

Fredrick H. Pfundt, Blaine, Wash., assignor of twenty-five percent to Cecil G. Pfundt, twenty-five percent to Philip S. Cook, Blaine, and twenty-five percent to Charles Mackie, Cove, Wash.

Application March 4, 1954, Serial No. 414,163

1 Claim. (Cl. 312—312)

This invention relates to an apparatus and a method for the smoking of fish, and, more particularly, to an apparatus and method by which fish are smoked in an atmosphere of wood pyrolysis products resulting from the heating of a log without actual burning of said log.

Prior to this invention non-commercial fishermen have found it difficult to smoke-cure their catch in that there has not been available an inexpensive apparatus for this purpose. The present invention purposes to provide such an apparatus, and namely one which may be inexpensively produced and which is unusually efficient in the performance of its intended smoking function. The present invention further purposes to provide a miniature smoke house and smoking method permitting a fisherman to effectively cure his fish immediately upon return from a fishing expedition, either at home or in or adjacent a cabin located in the vicinity of a fishing operation. The invention thus aims to provide an efficient apparatus for the curing of fish, and one which is of such small size and light weight as to be portable, and thus is capable of being carried in the trunk of an automobile or in a luggage carrier on the top of the car.

A further object of this invention is the teaching of a method for the curing of fish in a heated atmosphere of wood pyrolysis products, and which atmosphere is substantially free of the wood combustion products produced by the burning of wood.

Another and still more particular object of this invention is the heating of a log to pyrolyze the wood in said log without the burning of said log.

With yet additional objects and advantages in view which, with the foregoing, will appear and be understood in the course of the following description and claim, the invention consists in the novel construction and in the adaptation and combination of parts hereinafter described and claimed.

In the accompanying drawing:

Figure 1 is a fragmentary perspective view illustrating an apparatus for the curing of fish constructed in accordance with the preferred embodiment of the present invention.

Fig. 2, drawn on line 2—2 of Fig. 1, is a vertical cross-sectional view of the fish-curing apparatus, and, in phantom, shows the fish lying on the screen-trays while curing.

Fig. 3, drawn to a reduced scale, is a perspective view of the door for the fish-curing apparatus; and Fig. 4 is a fragmentary cross-sectional view drawn to an enlarged scale on line 4—4 of Fig. 1.

Referring to the drawing it is seen that there is provided a cabinet denoted generally by the numeral 10, and comprised of side walls 11 and 12, a back wall 13, a cover or top 14, a bottom 15, and a door 21 fitting over a front opening 39. The side walls 11 and 12 and the back wall 13 are preferably of a single continuous strip of sheet metal. Each side wall along its front edge is bent outwardly and thence is folded back upon itself to form, at each side of the front opening 39, an out-turned two-thickness sheet-metal flange, as 16 and 17. Also each side wall and the back wall along their lower edges folds inward and then upward to form flanges 18. Depending flange 19 on the sides and back of the bottom 15 are clamped between these flanges 18 and the cabinet walls to position the bottom in the cabinet, and to form a footing of a triple thickness of sheet metal which extends around approximately three-quarters of the base of the cabinet.

The cover 14 of this apparatus is of the configuration of a quadangular pyramid having slightly sloping triangular sides. Each of these sides extends slightly beyond the side walls 11 and 12 and the back wall 13, and then bends downwardly vertically to make an overlapping flush fit with these walls along their upper edge. The cover 14 also extends beyond the front of the apparatus and in front of the flanges 16 and 17 at which place the cover bends downward vertically forming a flange 20 which extends across the apparatus from one flange 16 to the other flange 17. Flange 20, in conjunction with the flanges 16 and 17, forms lips of triple thickness of sheet-metal. These lips act as a guide and as a support to position the upper part of the door on the front of the apparatus. In the cover 14 is an opening 22 near the apex of the pyramid's converging triangular sides, and in this opening is a boot 23 which extends from the inside of the apparatus, through the opening, and to the outside of the cover 14. On op of this boot, and surrounding the upper part, is seated a chimney 24 having a butterfly valve 25 and a handle 26 to control the egress of gases from the interior of the apparatus.

In contrast with the downwardly folding flanges 19 of the bottom section 15, the latter presents at its front edge a flange 29 which folds upwardly at about a right angle to the bottom plane and extends from the flange 16 and across the front of the apparatus to the other flange 17. This flange 29, in conjunction with the flanges 16 and 17, positions the lower part of the door 21 on the front of the apparatus.

On the inside of the side walls 11 and 12 are U-shaped angle irons 27. These U-shaped angle irons are vertically aligned with each other and support the screens 28 which in turn support the fish undergoing the curing process.

Naturally, it is to be understood that the elements of this fish curing apparatus, namely, the side walls 11 and 12 and the back wall 13, the cover 14, the bottom 15, and the U-shaped angle irons 27 are made into one integral unit, either by spotwelding, or any other suitable means which make a well-constructed rigid apparatus.

A door 21 co-acts with the flanges 16 and 20, and the flanges 17 and 20 on the upper part of the apparatus, and the flanges 16, 17 and 29 on the lower part of the apparatus to cover the opening 39 of the apparatus and to form an enclosed chamber for curing the fish. This door comprises a piece of sheet-metal having a flat section 30, vertical flanges 31 and 32 bordering the edges of this flat section, and flanges 33 and 34 running horizontally along the upper and lower edges, respectively, of this section. The section 30 is of slightly greater width than the front of the apparatus 10 is wide measured horizontally from the outer edge of flange 16 across the opening 39 and to the outer edge of flange 17. On the opposite sides of this section the vertical flanges 31 and 32 bend inwardly with respect to the apparatus at approximately right angles to the section and extend along the edges of 30 at this angle for almost the entire length of these vertical edges. However, near the top of these edges the flanges 31 and 32 again bend inwardly to be substantially parallel to 30 but in a spaced apart relation to this section so that flange 31 and the section 30, and the flange 32 and the section 30, form grooves or guides 50 and 51, respectively. When the door 21 is in position over the opening 39 on the front of the apparatus it is seen that the flange 31 encompasses and extends in back of the vertical flange 16 and that the flange 32 encompasses and extends in back of the vertical flange 17 to prevent the door from being pushed sideways of the apparatus, and that the three-ply lips formed by the upper parts of the flanges 16, 17 and the respective overlapping end portions of the flange 20 fit into the grooves 50, 51 of the door to lock the upper part of the door on the apparatus (see Fig. 4). On the lower edge of the section 30 the horizontal flange 34 bends slightly inward with respect to the apparatus and approximately vertically downward. This flange does not extend along the entire lower edge as each end of the flange adjacent the lower edge has been removed to give the flange a tongue-like appearance. When the door is positioned on the fish-curing apparatus this flange 34 extends inside of the apparatus and in back of the flange 29 on the bottom 15 so as to lock in place the lower part of the door 21. As is readily seen from the drawing, the door is easily unlocked by raising the door 21 a height sufficient for the grooves 50 and 51 to clear the upper edges of the three-ply lips formed by the flanges 16, 17 and 20, and for the door flange 34 to clear the flange 29. The door can then be lifted completely free of the rest of the apparatus. On the horizontal upper edge of section 30 is a flange 33 which bends outwardly with respect to the apparatus at approximately a right angle to the section making it easier to grasp the flange for the raising and the lowering of the door 21. Near the lower edge of the door are vent holes 35, a sliding draft regulator 37, and guides 36 in which this regulator slides.

The heat source for this fish-curing apparatus is an electric hot-plate 38 which is secured to the apparatus by a bolt 40 passing through the hot-plate and an opening 41 in the bottom, and a nut 42 on the end of this bolt. Electric lead-in wires 43 and 44 for this hot-plate pass through an opening 45 in the lower part of the back wall 13 and the flange of the bottom 15, extend underneath the apparatus and the bottom 15, and pass up and through an opening 46 in 15 to connect with the heating element in the hot-plate.

A preferred way of smoke-curing fish in this apparatus is to lay the fish on the screens 28, place a pie-pan 47 or the like on the heater 38, put a log 48 in the pie-pan 47, and then slide the door 21 in place over the opening 39 so as to form an enclosed chamber in the apparatus. Then the heater 38 is connected to a suitable electric outlet, the draft regulator 37 and the butterfly valve 25 adjusted, and the heater allowed to raise the temperature of the wood so that the wood will pyrolyze to produce an atmosphere in the apparatus comprising substantially the products resulting from the destructive distillation of wood. In this atmosphere, and at the elevated temperature in the apparatus, the fish will cure in a matter of a few hours. It is to be clearly understood that no combustion or burning of the wood takes place during the smoking of the fish or while the wood is in the apparatus, and that the fish are smoked in an atmosphere of products resulting from the destructive distillation of wood, and not in an atmosphere containing the products resulting from the combustion of wood, and which combustion readily occurs if sawdust, instead of a log, is heated in the pan in that the comminuted particles of wood of which sawdust is comprised are each substantially surrounded by air. As sawdust is heated the gases discharged from the multiple particles of wood combine with the air to produce a mixture readily able to support combustion, and a burning action, as distinguished from a smoking action, takes place. Even though the temperature responsible for heating the sawdust may be held at a level sufficiently low to preclude explosive ignition, there is nevertheless an actual combustion taking place between the expelled gases of the comminuted wood particles and the surrounding oxygen under any temperature sufficiently high to produce smoke, thus giving off disagreeable products associated with actual burning of wood. By smoking fish and meat in an atmosphere free of wood combustion products I am able to impart to the smoked fish or meat a flavor which is more pleasant to the taste.

The advantages of the invention, it is thought, will have been clearly understood from the foregoing detailed description of the illustrated preferred embodiment. Minor changes will suggest themselves and may be resorted to without departing from the spirit of the invention, wherefore it is my intention that no limitations be implied and that the hereto annexed claim be given a scope fully commensurate with the broadest interpretation to which the employed language admits.

What I claim is:

An apparatus for smoking fish or meat, said apparatus comprising a cabinet open to the front and having side walls, a back wall, a bottom, and a cover, the vertical front edge of each side wall bending outwardly at approximately a right angle to said side wall to form a vertical flange, the front edge of said bottom having an upturned edge, a door for said front opening, said door comprising a flat section, having an inturned vertical flange along each side edge, said vertical flange at the upper part thereof bending inwardly to lie substantially parallel to the flat section but in spaced relation thereto so as to form a groove, the lower edge of said flat section jogging inwardly and then bending approximately vertically downward to form a tongue, said grooves, when the door is positioned on the cabinet, mating with said out-turned flanges of the side walls and the downwardly directed tongue on the lower horizontal edge of the door extending into the fish-curing apparatus and in back of the upturned flange on the bottom to connect the door in position on the cabinet.

References Cited in the file of this patent

UNITED STATES PATENTS

| | | |
|---|---|---|
| 459,697 | Atkinson | Sept. 15, 1891 |
| 2,116,223 | Stacey | May 3, 1938 |
| 2,119,798 | Sivey | June 7, 1938 |
| 2,192,862 | Eagley | Mar. 5, 1940 |
| 2,266,131 | Thon | Dec. 16, 1941 |
| 2,342,373 | Schiewe | Feb. 22, 1944 |
| 2,585,799 | Lawrence | Feb. 12, 1952 |
| 2,680,667 | Wile | June 8, 1954 |